United States Patent
Nagel

(10) Patent No.: US 11,121,496 B2
(45) Date of Patent: Sep. 14, 2021

(54) CONNECTION DEVICE FOR CHARGING A BATTERY DEVICE ON A VEHICLE

(71) Applicant: Dr. Ing. h.c. F. Porsche Aktiengesellschaft, Stuttgart (DE)

(72) Inventor: Thomas Nagel, Waldbronn (DE)

(73) Assignee: Dr. Ing. h.c. F. Porsche Aktiengesellschaft

(*) Notice: Subject to any disclaimer, the term of this patent is extended or adjusted under 35 U.S.C. 154(b) by 200 days.

(21) Appl. No.: 16/486,196

(22) PCT Filed: Nov. 10, 2017

(86) PCT No.: PCT/EP2017/025332
§ 371 (c)(1),
(2) Date: Aug. 15, 2019

(87) PCT Pub. No.: WO2018/149468
PCT Pub. Date: Aug. 23, 2018

(65) Prior Publication Data
US 2020/0055413 A1     Feb. 20, 2020

(30) Foreign Application Priority Data
Feb. 15, 2017   (DE) .................... 10 2017 102 969.9

(51) Int. Cl.
*B60L 53/16*     (2019.01)
*B60L 53/10*     (2019.01)
(Continued)

(52) U.S. Cl.
CPC .......... *H01R 13/447* (2013.01); *B60L 53/11* (2019.02); *B60L 53/14* (2019.02); *B60L 53/16* (2019.02);
(Continued)

(58) Field of Classification Search
CPC .......... B60L 53/16; B60L 53/11; B60L 53/30; H01R 13/447; H01R 2201/26; H02M 3/3381
(Continued)

(56) References Cited

U.S. PATENT DOCUMENTS 5,382,171 A    1/1995  Hofmann et al.
5,751,135 A *  5/1998  Fukushima et al. ........................
                                                    H01R 13/7036
                                                            320/107
(Continued)

FOREIGN PATENT DOCUMENTS

DE         42 25 689      4/1993
EP         3 096 411     11/2016
WO        2012/165870    12/2012

OTHER PUBLICATIONS

International Search Report dated Mar. 14, 2018.

*Primary Examiner* — Sun J Lin
(74) *Attorney, Agent, or Firm* — Gerald E. Hespos; Michael J. Porco; Matthew T. Hespos

(57) ABSTRACT

A connection device for charging a battery device on a vehicle has an alternating current (AC) interface for receiving an AC plug and a direct current (DC) interface for receiving a DC plug. The DC interface has a cover flap mounted movably between a closed position that covers the DC interface and an open position that exposes the DC interface. The direct current interface has a latching mechanism with a latching means on the cover flap. The latching means locks with a mating latching means of the cover flap when in the open position. The mating latching means has an actuating section with which the DC plug makes a contact thereby unlocking the latching means of the latching mechanism when the DC plug is received in the DC interface.

10 Claims, 4 Drawing Sheets

(51) Int. Cl.
*B60L 53/30* (2019.01)
*H01R 13/447* (2006.01)
*H02M 3/338* (2006.01)
*B60L 53/14* (2019.01)

(52) U.S. Cl.
CPC ....... *H02M 3/3381* (2013.01); *H01R 2201/26* (2013.01)

(58) Field of Classification Search
USPC ........................................................ 320/109
See application file for complete search history.

(56) References Cited

U.S. PATENT DOCUMENTS

| | | | |
|---|---|---|---|
| 9,362,670 B2* | 6/2016 | Mo | B60L 53/16 |
| 9,533,588 B2* | 1/2017 | Sadano et al. | B60L 53/16 |
| 9,601,861 B2* | 3/2017 | Kanamori | H01R 13/4532 |
| 2014/0111144 A1 | 4/2014 | Mo | |
| 2014/0127924 A1 | 5/2014 | Kim | |
| 2015/0137755 A1 | 5/2015 | Sadano et al. | |
| 2016/0344131 A1 | 11/2016 | Kanamori | |

* cited by examiner

CONNECTION DEVICE FOR CHARGING A BATTERY DEVICE ON A VEHICLE

BACKGROUND

Field of the Invention. The invention relates to a connection device for charging a battery device of a vehicle, and to a DC plug for insertion into a connection device of this kind.

Related Art. It is known that vehicles have battery devices for driving the vehicle of this kind. The vehicle may be a purely electrically driven vehicle or a vehicle with an assisting electric motor, in particular so-called hybrid vehicles. Current interfaces usually are provided in electrically driven vehicles of this kind for charging the battery device by supplying the battery device with an associated current to the battery device. In this case, it is possible to distinguish between two concepts in respect of how and in what way the battery device can be charged. The first of these is an AC charging option, wherein a corresponding AC plug can be inserted into an AC interface. As an alternative, it is possible to use DC plugs to be inserted into a DC interface of a connection device of this kind.

One disadvantage of the known solutions is that it should be possible to charge vehicles with two different charging mechanisms, that is to say both with alternating current and also with direct current. Accordingly, separate interfaces in the form of an AC interface on the one hand and a DC interface on the other hand are required for this purpose. However, this can lead to confusion. Particularly in the case of charging situations in which a person who is not the owner of the vehicle is supposed to carry out a charging service, it is advantageous when only one single standard interface in the form of the AC interface is provided. However, if a different charging situation, for example at home in the garage of the vehicle owner, is intended to be provided, the DC interface is additionally expedient. The above explanation demonstrates that the combination of an AC interface on the one hand and a DC interface on the other hand for a connection device for charging a battery device of a vehicle not only increases the complexity of the system but also the complexity of handling by different categories of people.

An object of the invention is to overcome the disadvantages described above. A particular object of the present invention is to reduce the complexity in respect of use in a connection device with a twin charging function in a cost-effective and simple manner.

Features and details that are described in conjunction with the connection device according to the invention also apply in conjunction with the DC plug according to the invention, and in each case vice versa, with the result that reference is always made or can always be made mutually with regard to the disclosure in respect of the individual aspects of the invention.

SUMMARY

According to the invention, a connection device is designed for charging a battery device of a vehicle. To this end, the device has an electrical AC interface for receiving an AC plug and a DC interface for receiving a DC plug. The DC interface is equipped with a covering flap that is mounted such that it can be moved between a closed position that covers the DC interface, and a released position that releases the DC interface. A connection device according to the invention is distinguished in that the DC interface has a latching mechanism with a latching means on the covering flap. This latching means latches with a mating latching means of the covering flap in the released position. In this case, the mating latching means has an operating section which, when the DC plug is received in the DC interface, is contacted by said DC plug and releases the latching of the latching device.

According to the invention, the connection device is designed with two different and separate connection options for charging the battery device. The first of these is the AC interface that can be designed as a standard AC interface. In addition and separately therefrom, the DC interface the DC interface is provided and is designed for receiving the DC plug. At least the DC interface can be moved to two different positions subject to the respective position of the covering flap. The covering flap can at least partially cover the DC interface in the closed position of covering flap. In this covered position of the covering flap, access to the DC interface for a corresponding DC plug is no longer possible. Access and therefore insertion of a DC plug into the DC interface is possible only when the covering flap has been moved from the closed position to the released position.

In this case, the DC interface and the AC interface have substantially two main constituent parts. Each of the two interfaces has a geometric shape that can receive the associated and complementarily shaped plug in accordance with the key-and-lock principle. Furthermore, an arrangement of corresponding electrical connections is provided within the DC interface and within the AC interface. The arrangement can be brought into electrically conductive contact with associated electrical connections of the respective plug when the plug is inserted into the associated interface. In this case, the respective contour that can receive the associated plug in an interlocking manner is designed differently between the AC interface and the DC interface. This means that neither the DC plug nor the AC plug can be inserted into the incorrect interface.

In a manner according to the invention, it is now possible for the standard AC interface to be used for normal service operation during charging. Both the user of the vehicle and also a third party, for example the service staff at a filling or charging station, can now obtain direct access to the open AC interface in a simple and rapid manner and insert an associated AC plug there. In this case, it should be noted that the entire connection device in a vehicle usually is arranged behind a covering device, such as the filler cap in the case of vehicles. As soon as this filler cap opens, the respective person now has direct access to the AC interface but not to the DC interface since the DC interface is in a covered position, specifically the closed position of the covering flap.

If it is now desired to charge the vehicle in an exceptional situation, for example the garage at home, a hotel or another charging position by means of a DC functionality, the covering flap additionally has to be moved from the closed position to the released position. In the event of this movement, there is a change in the correlation of a latching means with the mating latching means of the covering flap, with the result that the mating latching means latches with the latching means in the released position and in this way the latching mechanism holds the covering flap in the open position, that is to say the released position. Therefore, after the covering flap is opened, it is easy to insert the associated DC plug into the DC interface since the covering flap, in the released position, is in a secured position due to the latching mechanism.

To now avoid a complex situation with an open DC interface remaining when the DC plug is withdrawn, the released position for the covering flap is terminated automatically according to the invention. This is achieved by way of contact being made with the operating section of the mating latching means as early as when the DC plug is inserted into the DC interface, with the aid of a geometric correlation in the DC interface with the DC plug. Due to this operation, the latching between the mating latching means and the latching means is canceled as early as when the DC plug is inserted into the DC interface. Therefore, as soon as the DC plug is in the inserted position in the DC interface, the covering flap is held in the released position only by way of there being a geometric correlation with the DC plug in the inserted position, and therefore folding into the closed position is prevented. This geometric correlation ends and the covering flap can be returned to the closed position in an automatic or partially automatic manner as soon as the DC plug is withdrawn from the DC interface at the end of the charging process.

On account of the combination of partially covering the connection device, specifically covering the DC interface with the covering flap, on the one hand and furthermore with substantially automatic closure after the charging process, the overall complexity of the connection device in respect of use is reduced considerably. For the normal charging process using the AC interface, the covering flap makes the DC interface effectively invisible or not identifiable in respect of its functionality. If charging is performed via the DC interface using a DC plug, the mere insertion of the DC plug ensures that the secured standard position will be reached automatically again after the charging process has ended and the DC plug has been withdrawn, specifically with the covering flap in the closed position.

The latching device may have a pretensioning means that applies a pretensioning force to the covering flap in the direction of the closed position. A pretensioning means is intended to mean a spring device that has a spring means, an elastomer or a similar component to provide a force. In particular, the pretensioning means may have an associated spring characteristic that provides a defined force for application depending on the relative position of the individual components in question in relation to one another. The pretensioning means therefore serves to always move the covering flap in the direction of the closed position, preferably as far as into the closed position, without any mating force. In particular, the pretensioning means may be designed such that the pretensioning force further includes a residual closing force in the case of the covering flap in this closed position. This means that undesired flapping in the closed position of the covering flap is avoided during driving of the vehicle. As soon as the DC plug is withdrawn from the DC interface, the pretensioning force leads to the pretensioning means moving the covering flap back to the closed position in an automatic manner and in a manner driven by the pretensioning force of the pretensioning means as soon as the movement is permitted by the withdrawal of the DC plug.

The covering flap may have a sliding surface for the DC plug to slide on when it is withdrawn from the DC interface. Sliding of this kind further facilitates the use options in the case of a connection device according to the invention. For example, when the DC plug is inserted into the DC interface, the latching mechanism is disengaged, as has already been explained. Therefore, the covering flap folds back to such an extent that it stops against the main body of the DC plug and the body of the DC plug prevents the covering flap from being moved farther to its closed position. This is particularly correlated with the pretensioning means according to the preceding paragraph. As soon as the charging process is ended, the DC plug is intended to be withdrawn from the DC interface. However, to this end, the contact-connection between the covering flap and the DC plug remains, so that sliding takes place. Within the meaning of the present invention, a sliding surface on the covering flap is a flat, preferably planar section that prevents latching or interlocking or snagging between the covering flap and the DC plug. This also ensures that automatic closing can be performed in a simple, cost-effective and rapid manner when using the described pretensioning means.

The mating latching means may be mounted to be moved between a latched position and a disengaged position. While static, mechanical, magnetic or combined embodiments of a latching mechanism are also conceivable in principle, a type of movable purely mechanical disengagement for the mating latching means is a particularly simple and cost-effective embodiment. In particular, exact definition and predetermination of the movement options of the individual components in relation to one another can be provided with the aid of simple geometric correlations of the individual components by virtue of the latched position and the disengaged position. In particular, the mating latching means can be provided such that it can move about a central latching bearing axis in this case. This latching bearing axis in one embodiment is parallel or substantially parallel to a bearing axis of the covering flap, which bearing axis can also be called the covering bearing axis.

The mating latching means may have a spring device that applies a spring force to the mating latching means in the direction of the latch position. The spring device likewise has a spring means that can provide the corresponding force, preferably with a spring characteristic. Due to this pretensioning with the aid of the spring device, latching takes place in a secured manner and automatically as soon as the covering flap has moved to the released position. At least one of the spring device and the mating latching means may have a separate disengagement functionality in the form of a disengagement means to be able to overcome the latching mechanism and move the covering flap back to the closed position even without inserting a DC plug.

The latching means may have a contour section for making sliding contact with the mating latching means as the covering flap moves between the closed position and the released position. In particular, the contour section is a curved, preferably a singly curved, surface. The contour section prevents undesired interlocking and therefore a mechanical defect between the latching means and the mating latching means or to reduce the probability thereof to a minimum. Therefore, the contour section serves at least partially to guide the mating latching means in its relative movement in relation to the latching means.

The covering flap may have a covering section which, in the closed position, covers the DC interface and leaves open the AC interface. As has already been explained, the DC interface may be designed as a standard interface so that direct access to the connection device and to the consequently exposed AC interface is possible after a filler cap of a vehicle is opened. Substantially exclusively covering the DC interface and leaving open the AC interface improves this advantage even further and brings to the fore the standardization with the AC interface when used when charging a battery device. Therefore, during normal charging, the AC interface is always automatically immediately accessible and the DC interface is removed in respect of the DC charging functionality by the covering flap in a first step.

The covering section may at least partially cover the AC interface in the released position of the covering flap.

Accidental incorrect insertion of an associated plug into the incorrect interface already is prevented by different geometric embodiments of the AC interface and the DC interface. However, at least partial covering of the AC interface in the released position can further ensure that the attempt to insert the DC plug into the AC interface is prevented for optical security reasons. This further reduces the complexity of the overall system and simplifies use when carrying out a charging process. Therefore, the covering flap has not only the first functionality, as has already been explained in a manner according to the invention, but furthermore has a second security functionality against undesired insertion into the incorrect interface.

A sensor device may be provided for identifying at least one of the following positions:
  closed position
  released position
  latched position
  disengaged position The above list is not exhaustive. In particular, a sensor signal or an output signal that correlates with the associated identified position can be produced with the aid of the sensor device. Therefore, a downstream control unit can be supplied with this output signal and can be matched to the corresponding actual use situation. If, for example, the covering flap is in the released position, an associated control unit can use this information to switch over to a charging process with the aid of the DC interface. Furthermore, the disengaged position of the latching mechanism can be used to establish that the associated DC plug is now in the inserted position in the DC interface and the charging process can now be started. As soon as the covering flap is then back in the closed position, the control unit can be switched over to the standard charging functionality with the aid of the AC interface.

A further subject matter of the present invention is a DC plug for insertion into a connection device according to the invention. A DC plug of this kind has a main body with a contact section for making contact with the operating section of the mating latching means of the latching mechanism. Therefore, a DC plug according to the invention has the same advantages as have been explained in detail with reference to a connection device according to the invention.

A system comprising a connection device according to the present invention and at least one DC plug according to the present invention is likewise a subject matter of the present invention.

Further advantages, features and details of the invention can be found in the following description in which exemplary embodiments of the invention are described in detail with reference to the drawings. In this case, the features mentioned in the claims or in the description may each be essential to the invention individually by themselves or in any combination.

DETAILED DESCRIPTION

Figure 1:
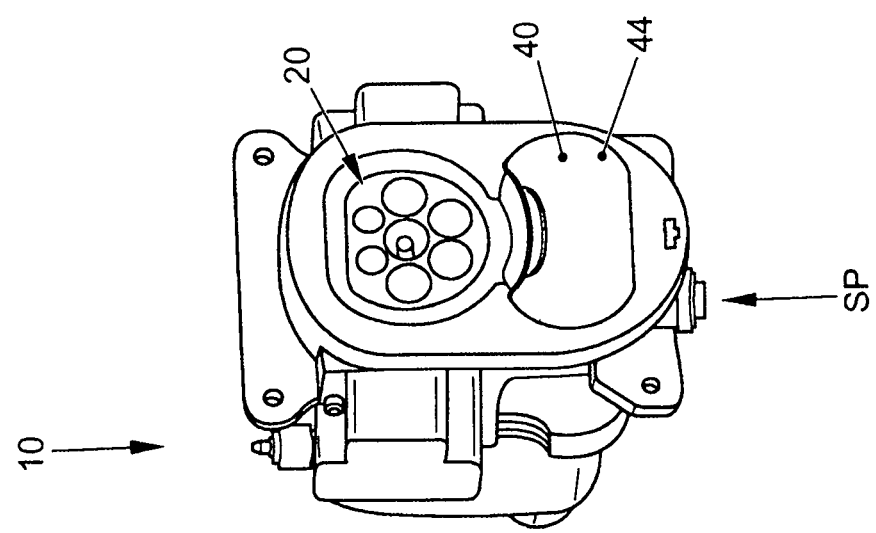
FIG. 1 schematically shows a connection device according to the invention in the normal state.

FIGS. 1 to 4 show, in a schematic manner, how a charging process can be carried out with the aid of a DC plug 130 at the DC interface 30 of the connection device 10. To this end, the connection device 10 is equipped with two separate interfaces, specifically the AC interface 20 on the one hand and the DC interface 30 on the other hand. If a filler cap on an electrically driven vehicle is opened, the view as shown in FIG. 1 can be seen. In other words, the AC interface 20 is open for access by an AC plug. If, however, for a special case, charging with the aid of an AC plug is not desired, the DC interface 30 has to be exposed. In the closed position SP, the DC interface 30 is still covered with the aid of a covering section 44 of the covering flap 40 and accordingly is neither visible nor accessible.

Figure 2:
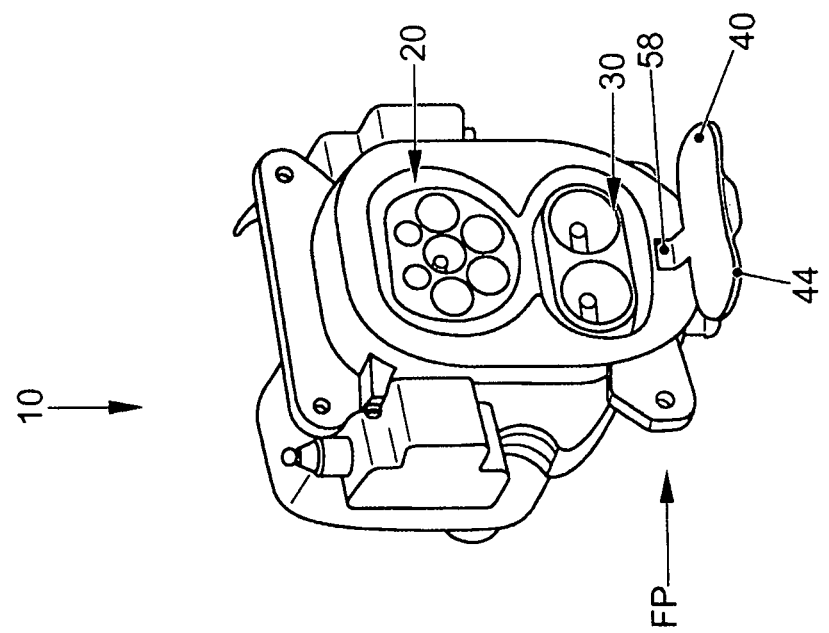
FIG. 2 schematically shows the embodiment of FIG. 1 with an open covering flap.

FIG. 2 shows the situation when the covering flap 40 has been moved to the released position FP. Therefore, in this released position FP, the covering section 44 has also been moved to a position in which direct access to and inspection of the DC interface 30 is now possible. It should further be noted that the covering flap 40 is pretensioned in the direction of the closed position SP with the aid of a pretensioning means 58. In order to therefore keep the covering flap 40 in the released position FP according to FIG. 2 counter to this pretensioning force of the pretensioning means 58, a latching mechanism 50 is provided, as will be further explained with reference to FIG. 5 later.

Figure 3:
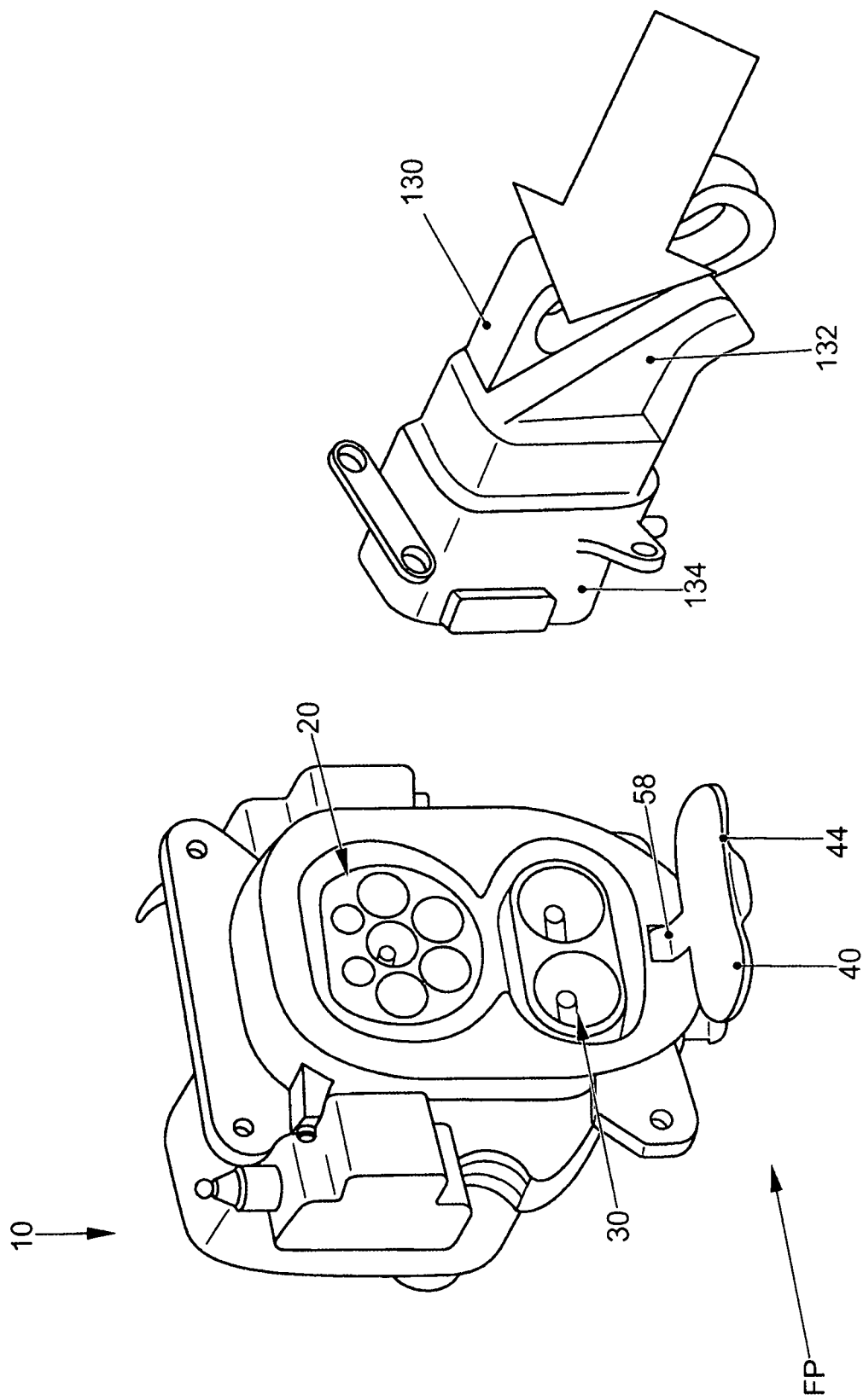
FIG. 3 schematically shows the embodiment of FIGS. 1 and 2 before insertion of the DC plug.
Figure 4:
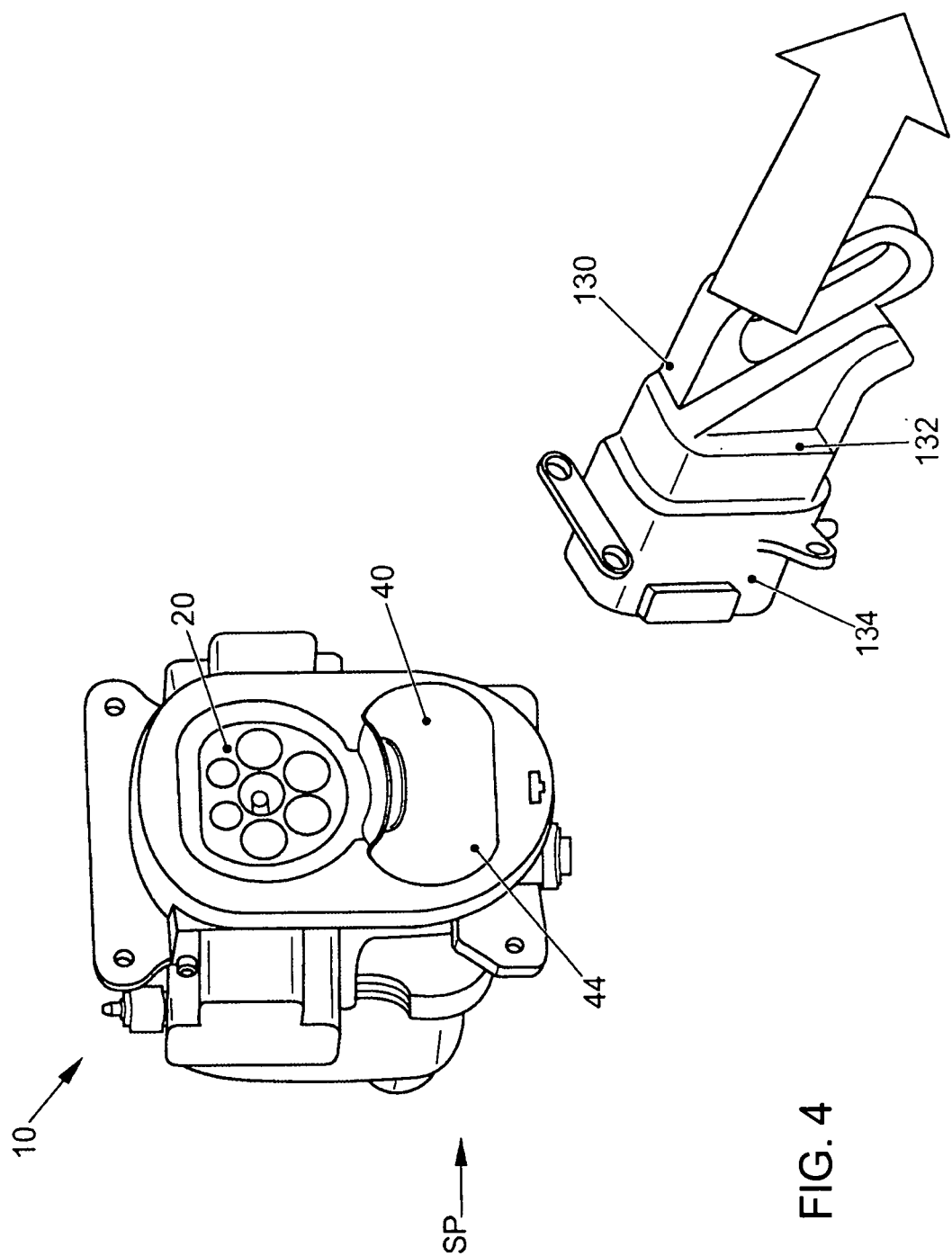
FIG. 4 schematically shows the embodiment of FIGS. 1 to 3 after withdrawal of the DC plug.
Figure 5:
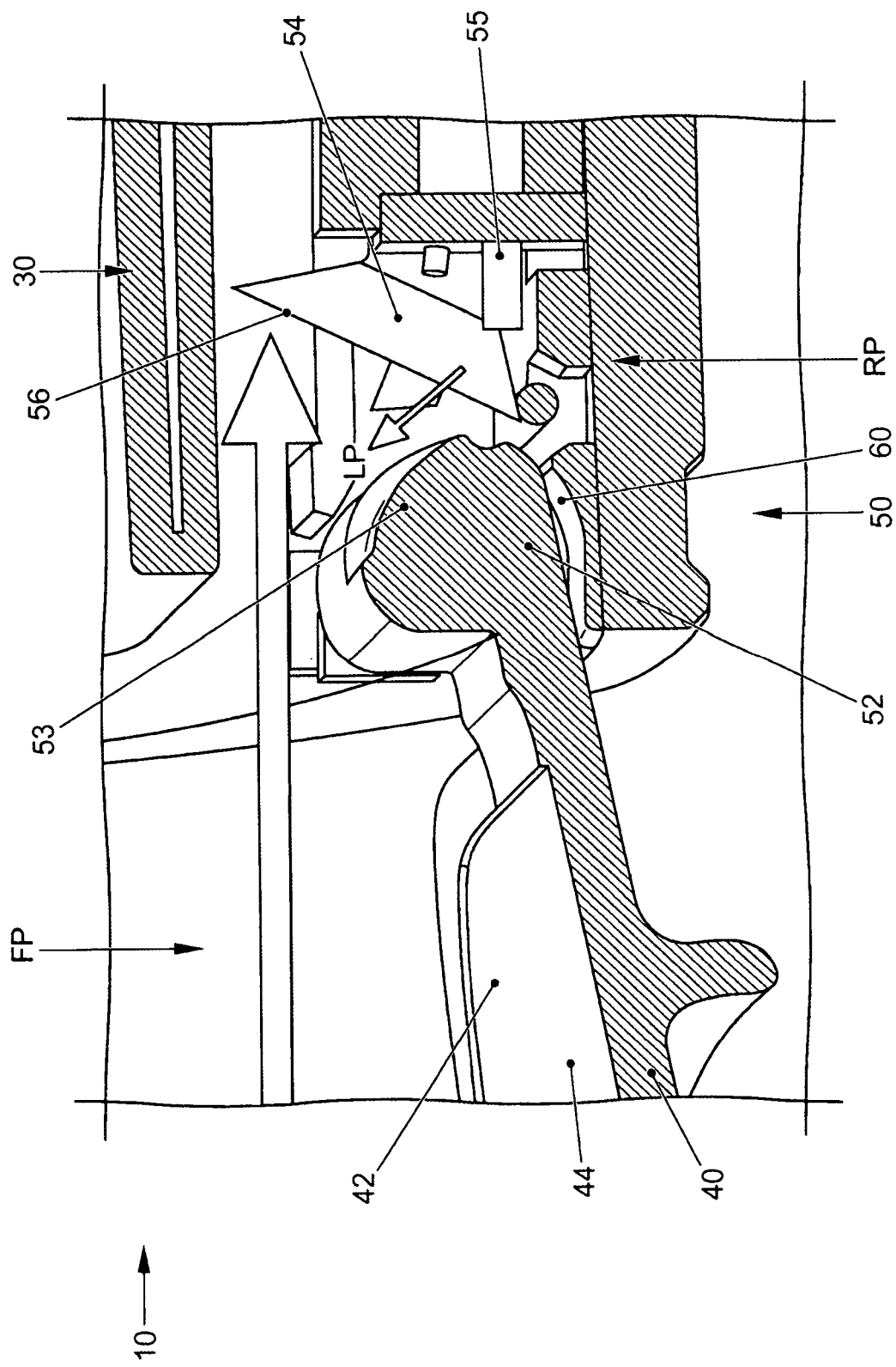
FIG. 5 shows an illustration of a detail of a latching mechanism in the connection device.

Therefore, as soon as access to the DC interface 30 according to FIG. 2 is then made possible by moving the covering flap 40 to the released position FP, the DC plug 130 according to FIG. 3 can be inserted into the DC interface 30. To this end, the DC plug 130 is equipped with a main body 132. A contact section 134 which has a corresponding correlation in a geometric manner within the DC interface 30 is provided at the front end of said main body, which front end is also designed as an interlocking section or mating interlocking section for ingress into the DC interface 30. When the DC plug 130 is inserted into the DC interface 30, the contact section 134 makes contact with an operating section 56 of a mating latching means 54, as is illustrated in the embodiment of FIG. 5 in particular. This leads to the latching functionality of the latching mechanism 50 being overcome. Therefore, in the inserted position of the DC plug 130, the pretension of the pretensioning means 58 is now applied to the covering flap 40 and moves said covering flap to a contact-making position with the main body 132 of the DC plug 130. On account of the latching of the latching mechanism 50 being overcome at this point, the covering flap 40 and therefore also the covering section 44 are automatically moved back to the closed position SP according to FIG. 4 again by virtue of the pretensioning force of the pretensioning means 58 when the DC plug 130 is withdrawn, as is schematically illustrated in FIG. 4.

FIG. 5 schematically shows how a latching mechanism 50 of this kind can be designed. If the covering flap 40 with the covering section 44 is moved to the released position FP, as is illustrated here in FIG. 5, the mating latching means 54 will slide over a contour section 53 and, in its latched position RP as is illustrated in FIG. 5, latch and secure the covering flap 40. As soon as the DC plug 130 is then inserted into the associated DC interface 30, contact is made between a contact section 134 and the operating section 56 of the latching means 54. In this way, the mating latching means 54 has moved back to the disengaged position LP, as is illustrated by an arrow in FIG. 5. A spring device 55 can serve to move that mating latching means 54 to the latched position RP with an associated force. As soon as the latching of the latching mechanism 50 is released, when withdrawing the DC plug 130, the covering flap 40 can be automatically returned to the closed position after the DC plug 130 is removed. Since contact is usually made between the main body 132 of the DC plug 130 on the one hand and the body of the covering flap 40 on the other hand here, a sliding surface 42 which can ensure secure sliding without snagging is provided in this embodiment.

The above explanation of the embodiments describes the present invention only on the basis of examples. It goes without saying that individual features of the embodiments can, provided that it makes technical sense, be combined with one another freely without departing from the scope of the present invention.

The invention claimed is:

1. A connection device for charging a battery device of a vehicle, the connection device comprising:
an alternating current (AC) interface for receiving an AC plug and a direct current (DC) interface for receiving a DC plug, the DC interface having a covering flap that is mounted in such a way that the covering flap can be moved between a closed position where the covering flap covers the DC interface, and a released position releases where the covering flap exposes the DC interface, the DC interface having a latching mechanism with a latching means on the covering flap, the latching means latches with a mating latching means of the covering flap in the released position, the mating latching means having an actuating section that is contacted by the DC plug when the DC plug is received in the DC interface said DC plug thereby releasing the latching means of the latching mechanism.

2. The connection device of claim 1, wherein the latching mechanism has a pretensioning means that applies a pretensioning force to the covering flap in a direction to achieve the closed position.

3. The connection device of claim 1, wherein the covering flap has a sliding surface for the DC plug to slide on when the DC plug is withdrawn from the DC interface.

4. The connection device of claim 1, wherein the mating latching means is mounted in such a way that the mating latching means can be moved between a latched position and a disengaged position.

5. The connection device of claim 4, wherein the mating latching means has a spring device that applies a spring force to the mating latching means in a direction to achieve the latched position.

6. The connection device of claim 4, wherein a sensor device is provided for identifying at least one of the following positions:
the closed position
the released position
the latched position
the disengaged position.

7. The connection device of claim 1, wherein the latching means has a contour section for making a sliding contact with the mating latching means as the covering flap moves between the closed position (SP) and the released position.

8. The connection device of claim 1, wherein the covering flap has a covering section that covers the DC interface and leaves open the AC interface when the covering flap is in the closed position.

9. The connection device of claim 8, wherein the covering section at least partially covers the AC interface in the released position of the covering flap.

10. A DC plug for insertion into the connection device of claim 1, the DC plug comprising a main body with a contact section for making a contact with the actuating section of the mating latching means of the latching mechanism.

* * * * *